United States Patent
Tohyama

(10) Patent No.: US 8,179,443 B2
(45) Date of Patent: May 15, 2012

(54) WAVEFORM DISPLAY APPARATUS AND METHOD

(75) Inventor: Kazutomo Tohyama, Kanagawa (JP)

(73) Assignee: Tektronix, Inc., Beaverton, OR (US)

( * ) Notice: Subject to any disclaimer, the term of this patent is extended or adjusted under 35 U.S.C. 154(b) by 1281 days.

(21) Appl. No.: 11/681,168

(22) Filed: Mar. 1, 2007

(65) Prior Publication Data
US 2011/0096172 A1  Apr. 28, 2011

(30) Foreign Application Priority Data
Mar. 1, 2006  (JP) .................................. 2006-54977

(51) Int. Cl.
H04N 17/00  (2006.01)
(52) U.S. Cl. ...................................... 348/184
(58) Field of Classification Search ................... 348/184, 348/513, 536, 441, 180, 181, 189
See application file for complete search history.

(56) References Cited

U.S. PATENT DOCUMENTS

| | | | | |
|---|---|---|---|---|
| 4,532,547 A | * | 7/1985 | Bennett ......................... | 348/518 |
| 4,819,196 A | * | 4/1989 | Lilley et al. ........................ | 708/3 |
| 4,959,718 A | * | 9/1990 | Bennett ......................... | 348/536 |
| 5,050,107 A | * | 9/1991 | Cannon et al. .................... | 358/1.3 |
| 5,459,524 A | * | 10/1995 | Cooper ......................... | 348/507 |
| 5,523,792 A | * | 6/1996 | Ciardi et al. .................... | 348/505 |
| 5,764,284 A | * | 6/1998 | Stoker ........................... | 348/181 |
| 5,903,308 A | * | 5/1999 | Cooper et al. ............. | 348/211.9 |
| 6,469,741 B2 | * | 10/2002 | Cooper et al. ................ | 348/441 |
| 6,989,869 B2 | * | 1/2006 | Cooper et al. ................ | 348/441 |
| 7,764,305 B2 | * | 7/2010 | Sato et al. ..................... | 348/181 |

* cited by examiner

*Primary Examiner* — Paulos Natnael
(74) *Attorney, Agent, or Firm* — Michael A. Nelson

(57) ABSTRACT

A waveform display apparatus that can display a waveform in a desired position even when an internal reference mode is switched to an external reference mode. The internal and external reference modes are switched with a reference select button 60. A user operates a phase adjustment knob 64 while watching a display 54 to adjust a phase relationship between an external reference video signal and a video signal under test. When the phase relationship becomes proper an offset save button 66 is pressed to store the phase offset at the situation in a memory 56. A CPU 30 reads out the phase offset according to needs such as the waveform display apparatus is turned on, etc. to control a phase adjustment circuit 44 for adjusting the phase relationship between the external reference video signal and the video signal under test.

12 Claims, 3 Drawing Sheets

WAVEFORM DISPLAY APPARATUS AND METHOD

CROSS-REFERENCE

The subject application claims priority under 35 U.S.C. 119 from Japanese patent application 2006-54977, entitled "Waveform Display Apparatus", (Tohyama), filed 1 Mar. 2006.

BACKGROUND

The present invention relates to a waveform display apparatus used for displaying a waveform of a video signal, especially to a waveform display related to a phase offset between external and internal reference modes.

Television broadcasting is conducted by preparing programs using video signals from video signal sources. The same program is sometimes broadcast using HDTV and simultaneously using SDTV such as NTSC. A station uses a video signal as a synch reference to synchronize the video signals of the different formats or from different video signal sources. The reference video signal is typically a black burst (BB) signal of the NTSC format.

A waveform monitor is suitable for watching and measuring various conditions of the video signals by displaying waveforms of the video signals provided at the video inputs. The waveform monitor has an internal reference mode and an external reference mode. The internal reference mode determines waveform display timing of an input video signal (a video signal under test) by deriving a trigger signal from the input video signal itself. The waveform monitor is previously adjusted not to cause a phase difference between the video signal and the trigger signal so that if a 42nd line is designated by line select function a waveform including the 42nd line is displayed. It is preferable to confirm the condition of the video signal under test.

The external reference mode derives the trigger signal from a video signal (an external reference video signal) provided at the external reference input terminal and a waveform of a video signal under test is displayed according to the trigger signal. In this case, there may be a phase difference between the video signal under test and the trigger signal so that even if a 42nd line is designated by line select function a displayed waveform may not include the 42nd line. Therefore it is suitable for watching and/or measuring an advance or delay (phase relationship) of the video signal under test relative to the external reference video signal. Typically, it is effective that the BB signal is provided at the external reference input to confirm a phase relationship of the video signal under test relative to the BB signal.

For convenience of the explanation below, peripheral technologies related to the waveform display apparatus are described here. Waveform display timing of a video signal under test in the external reference mode provides a stable waveform display of a video signal under test by simply deriving a trigger signal from the vertical and horizontal synch signals of an external reference video signal if the external reference video signal and the video signal under test have the same formats. However, if the field frequencies of the external reference video signal and the video signal under test are the same but the line frequencies are different a waveform display position would not be stable even by deriving a trigger signal from the horizontal synch signal of the external reference video signal because the line frequency is different from that of the video signal under test. U.S. Pat. No. 6,130,708, which is hereby incorporated herein by reference, discloses an invention that solves this problem and it is widely used in products, such as the WFM700 waveform monitor, WVR7100 waveform rasterizer, manufactured by Tektronix, Inc., Beaverton, Oreg. The invention produces a trigger signal of which phase becomes zero at any of the vertical synch signals of the external reference video signal and has the same line frequency as the video signal under test.

The WVR7100 waveform rasterizer features a function called timing display. FIG. 1 is an example of the timing display 10 concerning an external reference video signal and a video signal under test that have different frame frequencies. It measures how many lines and how many micro seconds the video signal under test advances or delays relative to the external reference video signal, and then the measured values are indicated in fields 20 and 22 respectively and timing relationship between both the signals is graphically displayed. U.S. Pat. No. 6,975,349 and U.S. Patent Publication No. 2004/0239764, which are both incorporated herein by reference, disclose it. The measurement is realized with a counter that counts a reference clock for a period between time points that the respective first lines of the first fields of the external reference video signal and the video signal under test arrive. The reference clock can be recovered from the external reference video signal or the video signal under test if one of them is a digital format.

At a broadcast station, the condition of a video signal, synch of the video signal relative to a reference video signal (BB signal), as well as other parameters are confirmed repeatedly during a broadcast. In doing so, the internal and external reference modes are sometimes repetitively switched repeatedly as well. At this time, it is sometime required that an initial phase relationship between the external reference video signal and the video signal under test is set up as a user desires, and then a waveform of the video signal under test is displayed to confirm whether the phase difference between them is getting larger with time.

In this case, the phases of the external reference video signal and the video signal under test are usually different at the inputs of the waveform apparatus since the paths that they have passed through are different. Therefore, if a waveform display is displayed in the internal reference mode and then the mode is switched to the external reference mode, the waveform display has a phase offset. For example, the 42nd line is designated and displayed using the line select in the internal reference mode and then the mode is changed to the external reference mode, another line may be displayed even if the same 42nd line is designated. This offset is inconvenient for observing the waveform so that a conventional video system may use an optional line that adds an offset to the external reference video signal from the synch signal generator to cancel the offset of the waveform display apparatus according to need.

Therefore it is desired to solve the phase offset of the video signal waveform display when the internal and the external reference modes are switched for improving operability.

SUMMARY

Embodiments of the present invention relates to a waveform display apparatus that receives an external reference video signal and a video signal under test to display a waveform of the video signal under test on a display screen in an internal or external reference mode. The internal reference mode and external reference mode can be selected with a selecting means. A phase adjust means adjusts a phase relationship between the external reference video signal and video signal under test by adding a phase offset to one or both the signals. The phase offset is stored in a memory. A controller such as a CPU reads out the phase offset as the need arises in such a case as the waveform display apparatus is turned on, an input of the external reference video signal or the video signal under test is detected, and controls the phase adjust means to adjust the phase relationship between the external reference video signal and the video signal under test.

The phase offset is determined manually or automatically and then stored in the memory. In the manual mode, a user adjusts a phase relationship between the external reference video signal and the video signal under test with the phase adjust means in the external reference mode, and makes the memory store the phase offset that provides a user desired phase relationship. In the auto mode, the phase difference detecting means detects a phase difference between the external reference video signal and the video signal under test, and a value to cancel the detected phase difference is stored as the phase offset in the memory.

The waveform display apparatus may further have an input signal format detecting means for detecting a format of the video signal under test. In this case, the memory stores phase offsets for the respective different formats of the video signal under tests, and the controller reads out a phase offset corresponding to the format of the detected video signal under test to make the phase adjust means adjust the phase relationship between the external reference video signal and the video signal under test.

The waveform display apparatus may further have an external reference video signal format detecting means for detecting the format of an external reference video signal. In this case, the memory stores phase offsets corresponding to the respective format combinations of the external reference video signals and the video signals under test, and the controller reads out a phase offset corresponding to the format combination of the detected external reference video signal and the detected video signal under test to control the phase adjust means to adjust the phase relationship between the external reference video signal and the video signal under test.

Embodiments of the waveform display apparatus provide proper display position even if the internal reference mode and the external reference mode are frequently switched by adding a proper phase offset to either the external reference video signal, the video signal under test, or both. This considerably reduces offset adjustment processes and improves operability of the waveform display apparatus.

The objects, advantages and other novel features of the present invention are apparent from the following detailed description when read in conjunction with the appended claims and attached drawings.

DETAILED DESCRIPTION

Figure 1:
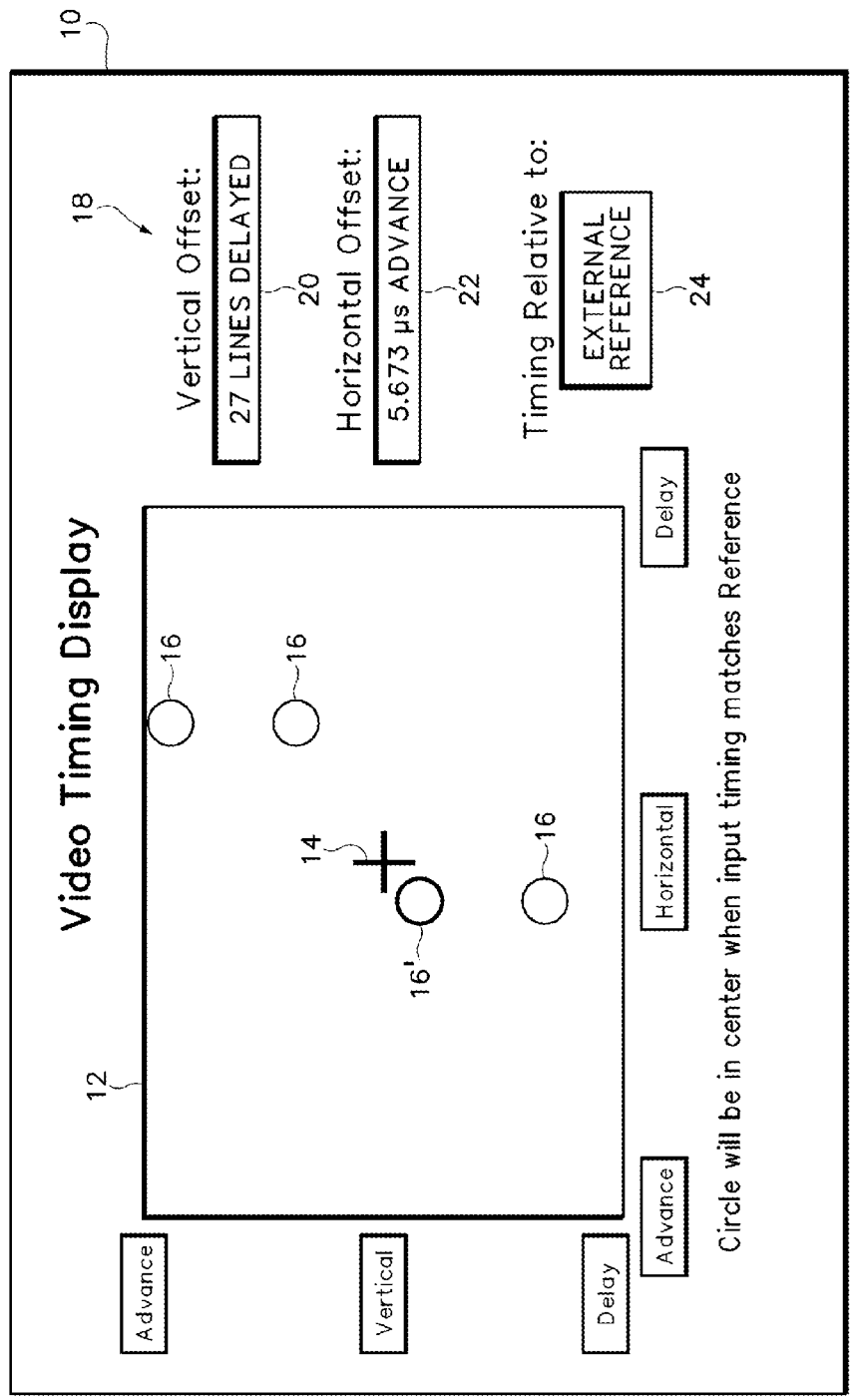
FIG. 1 (Prior Art) illustrates an example of a display for measuring a phase difference between an external reference video and a video signal under test.
Figure 2:
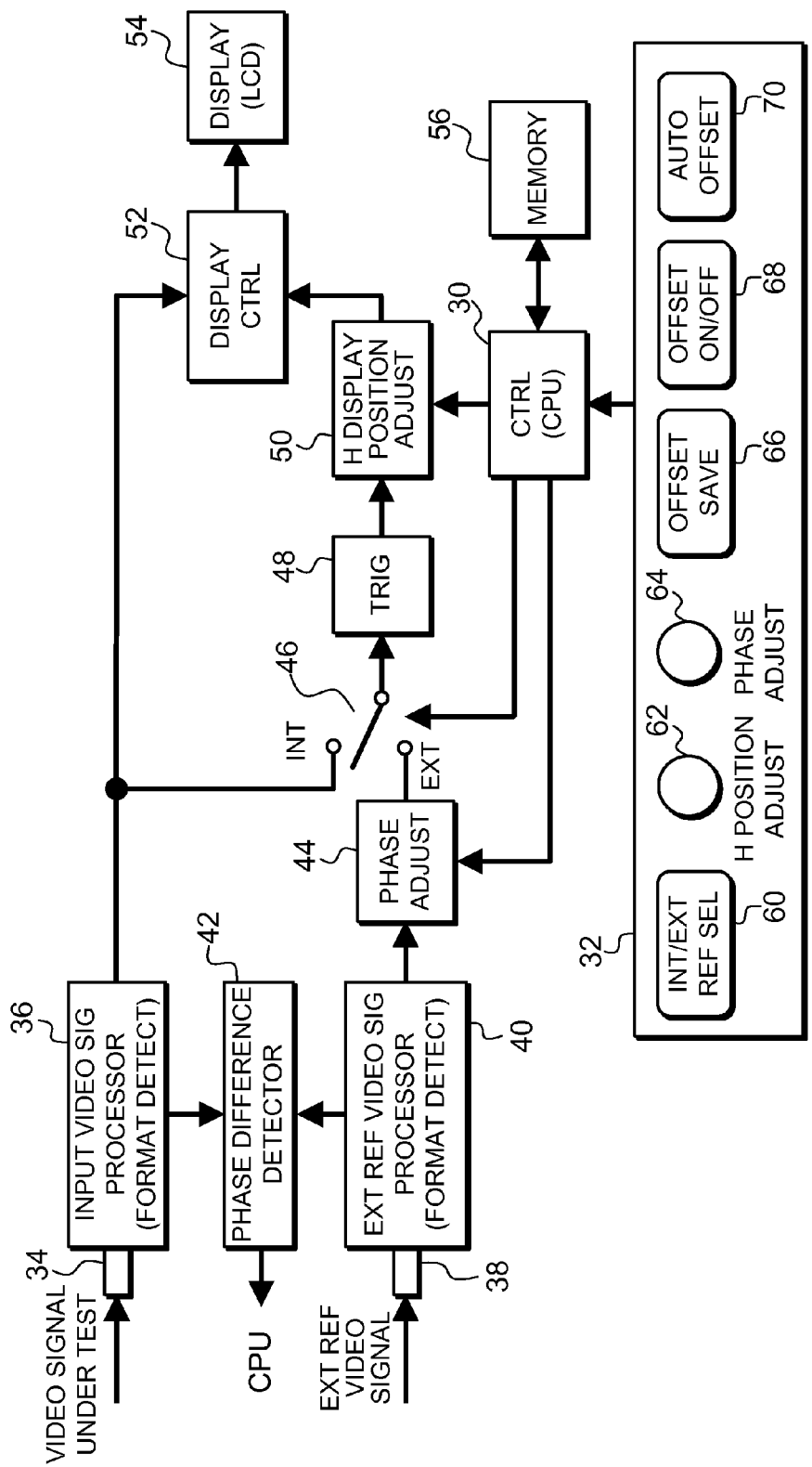
FIG. 2 illustrates a functional block diagram of an embodiment of a waveform display apparatus.

Referring to FIG. 2, an embodiment of a waveform display apparatus has blocks that a CPU 30 controls according to program stored in a memory 56 such as RAM, ROM, HDD, or to a separate memory or storage device which is not shown. A user can enter desired settings into the waveform display apparatus through an operation panel 32. A video signal under test is provided to an input video processor 36 via a video input 34. In some embodiments, the input video processing 36 detects a format of the input signal to process it depending on the format. For example, if it is an SDI signal (SMPTE292M) of HDTV, the processor 36 recoveries the reference clock that is provided to a phase difference detector 42 and decodes the parallel data that is provided to a mode select switch 46 and a display controller 52. The detected format information is also provided to the CPU 30 for the following processes.

An external reference video signal is provided to an external reference video signal processor 40 via an external reference input 38. In some embodiments, the processor 40 detects a format of the input signal and processes it depending on the format. For example, if it is a black burst (BB) signal of an analog NTSC format, it extracts the vertical and horizontal synch signals that are provided to the switch 46 via a phase adjustment circuit 44. The detected format information of the external reference video signal is also provided to the CPU 30 for the following processes.

The phase difference detector 42 has a counter and receives a pulse signal at an arrival time of a first line of a first field of the video signal under test from the input video signal processor 36 and receives a pulse signal at an arrival time of a first line of a first field of the external reference video signal from the external reference video signal processor 40, and a difference between the arrival times is determined by counting the reference clock from the input video signal processor 36 with the counter. The phase difference information between the external reference video signal and video signal under test as described above is provided to the CPU 30.

The phase adjustment circuit 44 delays the signals from the external reference video signal processor 40 according to the control of the CPU 30. The mode select switch 46 selects the signal from the input video signal processor 36 in case of the internal reference mode and selects the signal from the external reference video signal processor 40 in case of the external reference mode to provide the selected signal to a trigger circuit 48 according to the control of the CPU 30.

The trigger circuit 48 generates a trigger signal that decides waveform display timing on a time axis. For example, if the internal reference mode is selected and the video signal under test is the SDI signal, timing reference data included in the parallel data is used for generating the trigger signal. If the external reference mode is selected, and the external reference video signal is the BB signal, for example, and the video signal under test is the SDI signal, the trigger signal is generated base on a pulse signal in response to a vertical synch signal or frames derived from the BB signal and line frequency information derived from the timing reference data. Such a trigger signal may be generated using technology disclosed in U.S. Pat. No. 6,975,349 etc. and has a zero phase at one of the synch portions of the vertical synch signal of the external reference video signal and has the same line frequency as the video signal under test has.

A horizontal display position adjustment circuit 50 receives the trigger signal from the trigger circuit 48 and adjusts how many dots the displayed waveform should move in the time (horizontal) axis direction on the display screen of a display apparatus 54 according to the control of the CPU 30. The display control circuit 52 receives the signal from the input video signal processor 36 and lays out the waveform data on an internal bit map memory to display the waveform on the display screen of a display apparatus 54 such as a LCD, CRT, plasma, or other suitable display.

A user can operate an internal/external reference select button 60 on an operation panel 32 to alternate the internal reference mode and the external reference mode of the waveform display apparatus. The user also may operate a horizontal display position adjustment knob 62 to adjust the display position of the waveform on the display screen in the time (horizontal) axis direction. It should be noted that this operation does not adjust the phase relationship between the external reference video signal and the video signal under test and just changes the waveform position displayed on the display screen of the display apparatus 54 on the horizontal axis. The operation panel 32 may have an additional knob (not shown) for adjusting the displayed waveform position in the vertical direction.

When an offset ON/OFF button 68 is ON the user can further change the phase relationship between the external reference video signal and the video signal under test as the user likes by adjusting a phase adjustment knob 64 while watching the waveform on the display screen. If an offset save button 66 is pressed when the phase relationship gets to the preferable one, the phase offset at that time is stored in a memory 56 via the CPU 30. If the offset ON/OFF button 68 is kept ON, the CPU 30 reads out the phase offset depending on a format combination of the video signal under test and the external reference video signal from the memory 56 to control the delay in the phase adjustment circuit 44 when the waveform display apparatus is turn on again, a new input of the external reference video signal or the video signal under test is detected. The phase offset is kept constant unless the user changes it so that if the phase of the video signal under test changes relative to the external reference video signal, the phase change appears as the displayed waveform movement on the horizontal axis.

Note that if the offset ON/OFF button 68 is turned off the adjustment circuit 44 does not adjust the phase relationship between the external reference video signal and the video signal under test. Then the waveform of the video signal under test displayed on the display screen reflects on the phase relationship between both signals as it is. This is the same display as the conventional one and may be provided for compatibility. If the offset ON/OFF button 68 is turned ON from OFF again the phase offset is read out to adjust the phase.

In further embodiment, if an auto offset setup button 70 is pressed it gets into an auto offset mode and the CPU 30 computes a phase offset that makes a phase difference detected by the phase difference detector 42 zero to control the phase adjustment circuit 44 with the computed phase offset. The CPU 30 keeps the phase offset constant after the computed phase offset is reflected on the phase control by the phase adjustment circuit 44. Therefore even if it is in the auto offset mode the phase variation of the video signal under test relative to the external reference video signal appears as a movement of the displayed waveform on the horizontal axis. However, if it is detected that the external reference video signal or the video signal under test is changed and there is an input of another signal the phase difference detector 42 again detects a phase difference between both the signals to conduct a similar action as described above. The detection of the another signal being input may be conducted in such a case as the input stops for a given time or a format change is detected, for example.

Figure 3:
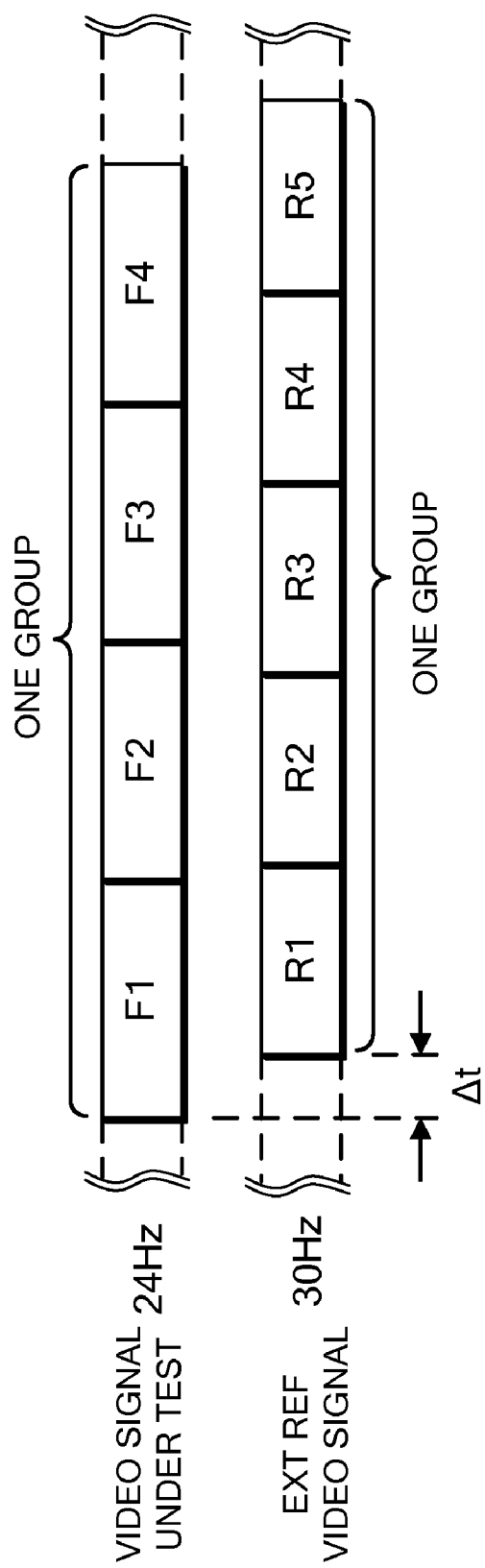
FIG. 3 illustrates a phase relationship between an external reference video signal and a video signal under test having different frame frequencies relative to each other.

An embodiment where the video signal under test is an SDI signal of HDTV and the external reference video signal is a BB signal of NTSC has been described. In other embodiments, a waveform display apparatus according to the present invention is applicable to other various format combinations. FIG. 3 shows a phase relationship between an external reference video signal and a video signal under test that have different frame frequencies relative to each other wherein the video signal under test has a frame frequency of 24 Hz and the external reference video signal has a frame frequency of 30 Hz for example. Because both the signals have a relationship of 5×24 Hz=4×30 Hz if four frames of the video signal under test and five frames of the external reference video signal are deemed as one group (or super frame) respectively, embodiments of the waveform display apparatus are also applicable to this case. That is, the trigger circuit 48 generates a trigger signal that has a zero phase every five frames of the vertical synch signal of the external reference video signal and has the same line frequency as the video signal under test in the external reference mode. In the auto offset mode, the CPU 30 treats the four frames of the video signal under test and the five frames of external reference video signal as one group respectively and the phase difference detector 42 detects a phase difference Δt between both the groups. Then the phase offset is computed from the phase difference Δt. As described, different format combinations of the external reference video signals and the video signals under test lead to different phase offsets nevertheless the CPU 30 makes the memory 56 store the phase offsets corresponding to the format combinations of both the signals respectively as in a lookup table and read out them as necessary.

Although the invention has been disclosed in terms of the preferred and alternative embodiments disclosed herein, those skilled in the art will appreciate that modifications and improvements may be made without departing from the scope of the invention. For example, in the case of FIG. 2, the phase adjustment circuit 44 is located following the external reference video signal processor 40 but it can be located following the video signal processor 16. That is, the phase adjustment between the external reference video signal and the video signal under test can be conducted by adding a phase offset to either or both signals. The combination of the present invention and known technologies such as the mentioned U.S. Patents disclose allows various formats of digital, analog, SDTV, HDTV, etc. to use as the external reference video signal and the video signal under test. The waveform display apparatus may use a CRT that draws a waveform with an electronic beam or a display device that the waveform is developed as bitmap data for displaying.

Embodiments of the present invention can display a waveform of the video signal under test as in a user desired condition even if the internal and external modes are frequently switched. Even if a format of the video signal under test or the external reference video signal is changed a waveform display position is adjusted properly each time. Therefore a waveform display apparatus featuring embodiments of the present invention can set up a waveform display position properly in case of using an external reference video signal and does not require troublesome display position adjustment or separately offsetting the external reference video signal thereby improving operability of the waveform display apparatus.

Although the invention has been disclosed in terms of the preferred and alternative embodiments disclosed herein, those skilled in the art will appreciate that modifications and improvements may be made without departing from the scope of the invention.

What is claimed is:

1. A waveform display apparatus for receiving an external reference video signal and a video signal under test and displaying the video signal under test as a waveform on a display in both an internal reference mode and an external reference mode comprising:
- means for selecting between the internal reference mode and the external reference mode;
- means for adjusting a phase relationship by adding a phase offset to one of the external reference video signal and the video signal under test;
- a memory for storing the phase offset;
- a controller reading the phase offset for controlling the adjusting means to adjust the phase relationship between the external reference video signal and the video signal under test; and
- means for detecting the format of the video signal under test, wherein the memory stores the phase offset based upon the format of the video signal under test and the controller reads out the phase offset according to the detected format of the video signal under test and controls the means for adjusting the phase relationship to adjust the phase relationship between the external reference video signal and the video signal under test.

2. The waveform display apparatus of claim 1, further comprising means for detecting a phase difference between the external reference video signal and the video signal under test, wherein the phase relationship is adjusted to cancel the phase difference.

3. The waveform display apparatus of claim 1, further comprising means for detecting the format of the external reference video signal, wherein the memory stores the phase offset based upon the format of the external reference video signal and the controller reads out the phase offset according to the detected format of the external reference video signal and controls the means for adjusting the phase relationship to adjust the phase relationship between the external reference video signal and the video signal under test.

4. The waveform display apparatus of claim 1 wherein the controller keeps the phase offset constant after the phase relationship between the external reference video signal and the video signal under test is adjusted.

5. A waveform display method for receiving an external reference video signal and a video signal under test and displaying the video signal under test as a waveform on a display in both an internal reference mode and an external reference mode comprising:
- selecting between the internal reference mode and the external reference mode;
- adjusting a phase relationship by adding a phase offset to one of the external reference video signal and the video signal under test;
- storing the phase offset in a memory;
- reading the phase offset;
- adjusting the phase relationship between the external reference video signal and the video signal under test; and
- detecting the format of the video signal under test, wherein the memory stores the phase offset based upon the format of the video signal under test and the phase offset is read out according to the detected format of the video signal under test to adjust the phase relationship between the external reference video signal and the video signal under test.

6. The waveform display method of claim 5, further comprising detecting a phase difference between the external reference video signal and the video signal under test, wherein the phase relationship is adjusted to cancel the phase difference.

7. The waveform display method of claim 5, further comprising detecting the format of the external reference video signal, wherein the memory stores the phase offset based upon the format of the external reference video signal and the phase offset is read out according to the detected format of the external reference video signal to adjust the phase relationship between the external reference video signal and the video signal under test.

8. The waveform display method of claim 5 further comprising keeping the phase offset constant after the phase relationship between the external reference video signal and the video signal under test is adjusted.

9. A waveform display apparatus for receiving an external reference video signal and a video signal under test and displaying the video signal under test as a waveform on a display in both an internal reference mode and an external reference mode comprising:
- mode select switch to select between the internal reference mode and the external reference mode;
- a phase adjustment circuit adapted to adjust the phase relationship by adding a phase offset to one of the external reference video signal and the video signal under test;
- a memory for storing the phase offset;
- a controller reading the phase offset for controlling the phase adjustment circuit to adjust the phase relationship between the external reference video signal and the video signal under test; and
- a format detector to determine the format of the video signal under test, wherein the memory stores the phase offset based upon the format of the video signal under test and the controller reads out the phase offset according to the detected format of the video signal under test and controls the phase adjustment circuit to adjust the phase relationship between the external reference video signal and the video signal under test.

10. The waveform display apparatus of claim 9, further comprising a phase difference detector that determines a phase difference between the external reference video signal and the video signal under test.

11. The waveform display apparatus of claim 9, further comprising a format detector to determine the format of the external reference video signal, wherein the memory stores the phase offset based upon the format of the external reference video signal and the controller reads out the phase offset according to the detected format of the external reference video signal and controls the phase adjustment circuit to adjust the phase relationship between the external reference video signal and the video signal under test.

12. The waveform display apparatus of claim 9 wherein the controller keeps the phase offset constant after the phase relationship between the external reference video signal and the video signal under test is adjusted.

* * * * *